United States Patent [19]

Rousset et al.

[11] 4,424,290

[45] Jan. 3, 1984

[54] FILTRATE REDUCER ADDITIVE FOR SWELLING CLAY GROUTS AND CEMENT-SWELLING CLAY GROUTS

[75] Inventors: Jacky Rousset, Baneins; Roger P. Chavrier, Marseilles, both of France

[73] Assignee: Societe Coatex, Paris, France

[21] Appl. No.: 292,599

[22] Filed: Aug. 13, 1981

[51] Int. Cl.³ .................. C04B 13/00; C04B 43/00; C04B 7/14

[52] U.S. Cl. .................................. 524/5; 526/240; 106/111; 106/116; 524/4

[58] Field of Search ............... 524/5, 4; 526/240; 106/111, 116

[56] References Cited

U.S. PATENT DOCUMENTS

| | | | |
|---|---|---|---|
| 3,037,957 | 6/1962 | Bruere | 524/5 |
| 3,806,571 | 4/1974 | Ronnmark et al. | 524/5 |
| 3,917,771 | 11/1975 | Basile | 524/5 |
| 4,229,224 | 10/1980 | Dawson et al. | 524/5 |
| 4,293,344 | 10/1981 | Joseph | 106/116 |

*Primary Examiner*—John C. Bleutge
*Assistant Examiner*—Herbert J. Lilling
*Attorney, Agent, or Firm*—McDougall, Hersh & Scott

[57] ABSTRACT

An additive for swelling clay grouts and cement-swelling clay grouts, intended to reduce the filtrate, lower and stabilize viscosity, retard rigidification time, limit sweating and sedimentation of the solid constituents, is an alkaline ethylenic acid polymer and/or copolymer, with molecular weight between 500 and 20,000, but preferably between 1000 and 6000.

This additive is especially advantageous in the fields of civil engineering, building, public works and drilling.

14 Claims, No Drawings

FILTRATE REDUCER ADDITIVE FOR SWELLING CLAY GROUTS AND CEMENT-SWELLING CLAY GROUTS

The present invention concerns a new additive for swelling clay grouts and cement-swelling clay grouts, commonly used in civil engineering, building, public works and drilling, intended to greatly reduce filtrates, decrease and stabilize their viscosity, limit sedimentation of the solid constituents and retard rigidification.

As used herein, cement-swelling clay grouts relate to grouts, mortars and plastic concretes, composed or not of a mixture which contains, among its constituent materials, swelling clays such as bentonites consisting of at least 60% by weight montmorillonite, or betonitic clays consisting of, for example, between 10 and 60% by weight montmorillonite, or montmorillonite, attapulgite, sepiolite, illite base clays, or other argillaceous constituents.

The technician has known for some time that in the fields of civil engineering, building, public works, drilling, etc., the application of cement-swelling clay grouts presents problems which result in loss of time and product for the applier and make on-site handling difficult.

This is why, for example, that during the construction of water-tight walls or shields in aquiferous permeable ground, the construction of prefabricated reinforced walls or the strengthening or tightening of ground, the use of cement-swelling clay grouts, when applied, often results in significant, bothersome problems such as, for example, changes in consistency with the premature thickening of the grout, which may either be due to filtration through the permeable ground or to significant grout loss because of infiltration in the ground near the work area.

The on-site user experiences the above-cited problems which he knows well and which he has had to tolerate, for these problems effect construction time and construction costs. To illustrate one of the particular, harmful problems, the professional knows by experience that very often he must use a large quantity of grout, sometimes up to three times as much as the dig, when he works on very permeable terrain, for example, alluvial terrain.

For several years, the technician, in his research, has tested ways to obtain cement-swelling clay grouts which would display basic qualities such as reduced filtrates, viscosity remaining low and constant in time, limited sedimentation of the solid constituents and retarded rigidification.

Although much research has been done to alleviate the above-mentioned problems, the literature in the field focuses mainly on slow setting compositions. This literature cites, as common practice, adding slow setting compositions to, for example, concretes, these compositions generally being put in solution in the preparation water of said concretes in order to modify the hydration speed of the cement compounds.

With this in mind, French patent No. 1 437 173 describes one such composition consisting of a slow setting agent and a soluble sulfate, with the slow setting agent being a lignosulfonic, gluconic, adipic, tetrahydroxyadipic, salicylic acid or a salt of these acids.

To the same end, French patent No. 2 115 751 describes a clinker and/or blast furnace slag base hydraulic binder slow setting composition, said composition composed of polyphenols from the extraction of catechuic type Tanins.

When used correctly, all of these additives are effective in retarding the setting of a hydraulic binder, or in making it more fluid, without disturbing mechanical performance, in specific technical applications such as utilization of hydraulic binder by pumping or distribution from a preparation plant, concreting in hot weather, concrete repair work, long distance and low depth grouting, etc.

However, none of these additives applied to cement-swelling clay grouts were able to optimize those basic qualities desired for so long by the technician; these being greatly reduced filtrates, viscosity that is low and constant in time, limited sedimentation of solid constituents and slow rigidification.

Well aware of these observations, the applicants, having researched a long time in this field, have found and developed a new additive performing well with cement-swelling clay grouts and able to reduce considerably the above-mentioned problems.

The additive in the invention designed for swelling clay grouts and cement-swelling clay grouts, is characterized in that it is an ethylenic acid alkaline polymer and/or copolymer soluble in aqueous medium, with an average molecular mass comprised between 500 and 20,000, but preferably between 1000 and 6000.

These ethylenic polymers and/or copolymers are prepared according to known processes by radical polymerization in aqueous medium or ethylenic acid hydroalcoholic medium in the presence of polymerization regulators such as, for example, hydroxylamine base organic compounds, and in the presence of polymerization initiators such as peroxides and persalts, for example, hydrogen peroxide, persulfates, etc.

The ethylenic acid polymers and/or copolymers are generally made from ethylenic monomers, alone or in mixture, of acrylic, methacrylic, itaconic, maleic, fumaric, methallyl sulfonic acids and the methylic, ethylic, propylic, isopropylic and butylic esters of these acids; this is because the applicants have observed that when these esters are present, even in small quantities, the qualities of the new additive are reinforced.

When the ethylenic acid polymers and/or copolymers are prepared in a known manner by radical polymerization in a hydroalcoholic medium, the alcohol is selected from the group composed of methanol, ethanol, propanol, isopropanol, butanol.

After radical polymerization in the presence of well known regulators and initiators, the aqueous solution of polymerizate obtained is neutralized by an appropriate agent such as sodium, potassium, ammonium, lithium, hydroxide or by a primary secondary or tertiary, aliphatic or cyclic amine, such as for example the mono, di or tri-ethanolamines, mono, di or tri-ethylamine, cyclohexylamine, methylcyclohexylamine, etc.

The aqueous solution of polymerizate neutralized as above can be used in this form as a filtrate reducer additive, but it can also be treated, by all known methods, to eliminate its aqueous phase and isolate the neutralized ethylenic polymer and/or copolymer in the form of a fine powder which can be used as such as a filtrate reducer additive for cement-swelling clay grouts.

In practice, the above grouts are formed of 5–600 kg/m$^3$ of swelling clays, and preferably from 25 kg–400 kg/m$^3$, and of 40 kg–2000 kg/m$^3$ of cement, and preferably from 80–400 kg/m$^3$ of cement combined or not with aggregates of diverse origins and various size.

The cements entering into the composition of the above grouts are generally common cements, for example, slag cements which are resistant to aggressive waters, such as, for example, water containing sulfates, sea water, etc.

The amount of additive introduced into the cement-swelling clay grout is comprised between 0.01% by weight and 10%, but is preferably comprised between 0.5% and 2% by weight of dry material with respect to the swelling clay mass present.

There are many ways that the additive in the invention can be introduced into the swelling clay grouts and the cement-swelling clay grouts.

First, it can be incorporated into the swelling clay beforehand at any stage of its manufacture, this clay then being used to prepare the grout itself.

It can also be added to the grout preparation water or to the swelling clay gel previously prepared. In this case, the cement is added to bentonite gel.

Or the additive can be introduced into the already prepared cement-swelling clay grout.

The applicants were able to observe that the additive in the invention introduced into the cement-swelling clay grouts improved significantly the properties of handling, fluidity, stability, homogeneity as well as the clogging properties due to the reduction of filtrates.

It is therefore remarkable that within the given low weight concentrations, the additive in the invention, for the set grout, causes almost no sweating, no segregation of cement particles, fluidity which is much improved, low and stable in time as well as a 60–90% reduction of filtrates tested according to standard API RP 13 B.

Finally, the applicants were particularly interested in noting that the additive in the invention has the added advantage of increasing the mechanical characteristics of the grouts once they have hardened, and improving the tightness characteristics of all the construction works built with these grouts because of the additive's excellent homogeneity.

The significance and advantages of the invention will be better appreciated with the following examples.

EXAMPLE 1

The purpose of this example is to show the object of the invention when the additive is an alkaline polyacrylate and to demonstrate the effects of this additive by comparing the characteristics of cement-bentonite grouts containing increasing quantities of said additive going from 0–4% by weight of commercial product to 40% dry extract with respect to the bentonite.

The filtrate reducer additive was obtained by radical polymerization of acrylic acid in a hydroalcoholic medium constituted by a mixture of water and isopropanol, according to processes well known to the technician.

The aqueous solution of acrylic polymer, free of isopropanol and neutralized by sodium hydroxide, had a dry material concentration of 40% and a density of 1.3. The average molecular weight of said polymer measured by gel chromatography was 3000.

Then a cement-swelling clay grout was prepared by introducing, at 15° C. into a 5 liter beaker, 2000 g of water and 60 g of Bentonite (Bentonil C.V. 15 prepared with bentonite from the Island of Kimolos), subjecting the suspension thusly constituted to stirring for 5 minutes by means of a Rayneri stirrer, with a rotation speed of 2200 RPM, this stirrer equipped with a centripetal turbine 500 millimeters in diameter.

After the bentonite gel has set for one hour, the additive in the invention is added, in the form of a 40% dry material aqueous solution, and the mixture is stirred for two minutes.

Finally, 400 g of CLK 45 cement, composed of 20% clinker and 80% slag, is introduced into the additive-added bentonite gel and subjected to the same stirring for 7 minutes.

The cement (C) water (W) ratio, written C/W, of the cement-bentonite grout is equal to 0.2.

The additive in the invention was introduced into the bentonite gels in concentrations increasing from 0–4% by weight of product to 40% with respect to the bentonite. test 1 is the reference test for the cement-bentonite grout without said additive and tests 2–5 demonstrate the object of the invention.

The various bentonite gels before and after the additive was added, then after the cement was introduced, underwent several checks, such as apparent MARSH viscosity, API filtrate and cake, sweating and rigidification time corresponding to MARSH viscosity of 1 minute 30 seconds, with the grout being stirred slowly between 400 and 600 RPM.

MARSH viscosity is measured in an apparatus with the same name, formed of a cone with a 1500 cm3 capacity, equipped at its bottom with a nozzle calibrated at 4.74 millimeters (3/16 inch USA) and a cm3 graduated cup; to take this measurement, close the nozzle, fill the cone with the suspension that has been previously filtered on a 10 Mesh screen, then determine the time required for a 946 cm3 (¼ gallon USA) flow of the aforementioned suspension. This time expressed in seconds is commonly referred to as MARSH viscosity.

The filtrate and cake were measured according to US standard API No. RP 13 B.

Sweating is measured with a 1-liter graduated test tube into which a cement-bentonite grout is placed. After setting for 4 hours, the change in separation between the suspension and the aqueous phase is observed and measured; sweating is expressed as a percentage of the volume of aqueous phase compared with the initial volume of grout.

All results for the various bentonite gels before and after the cement is introduced obtained by the above-mentioned check methods are shown in Table 1 below.

TABLE 1

| | Test 1 | Test 2 | Test 3 | Test 4 | Test 5 |
|---|---|---|---|---|---|
| Additives as in invention | 0% | 1% | 2% | 3% | 4% |
| | for bentonite gel only | | | | |
| Marsh Viscosity in seconds | 33.5 | 31 | 30 | 29 | 28.5 |
| A.P.I. filtrate in cm3 | 14 | 13.5 | 13 | 12 | 11.5 |
| | for grout after addition of 200 g/l of CLK 45 cement | | | | |
| Marsh Viscosity in seconds | 43 | 41 | 38 | 37 | 36 |
| A.P.I. filtrate in cm3 | 195 | 135 | 95 | 65 | 45 |
| Cake thickness in mm | 9 | 6.5 | 4.5 | 2.5 | 2.1 |
| Sweating in % | 1 | 0 | 0 | 0 | 0 |
| Rigidification time in hrs. | 4–5 | 6–7 | 8–9 | 10–12 | more than 20 |

The introduction of the additive in the invention causes a very significant reduction of filtrate, as indicated by the API measurement when the additive in the invention is introduced in increasing quantities.

It can also be seen that when said additive is introduced into the cement-swelling clay grout, there is almost no sweating.

Marsh viscosity is reduced to a value which greatly facilitates work conditions after the additive in the invention is added. Finally, the rigidification time is actually quite increased enabling easier on-site handling.

EXAMPLE 2

This example shows the general behavior of the additive no matter which swelling clay is used in the grout.

In this case, the swelling clay was prepared with a treated Bavarian bentonite (Bentonil C for drilling).

The additive used was the same as in Example 1, as were the operating conditions, checks, etc., for this additive and grouts.

As in Example 1, the additive in the invention was introduced in concentrations increasing from 0-4% by weight of commercial product to 40% dry extract with respect to the swelling clay.

Test 6 is the reference test for the grout without additive and tests 7-10 demonstrate the object of the invention.

All results obtained with these checks are found in Table 2 below.

TABLE 2

|  | Test 6 | Test 7 | Test 8 | Test 9 | Test 10 |
|---|---|---|---|---|---|
| Additives as in invention | 0% | 1% | 2% | 3% | 4% |
|  | for Bentonite gel only (approx. 24 hrs. set) | | | | |
| Marsh Viscosity in seconds | 42 | 34 | 33 | 32 | 32 |
| API filtrate in cm3 | 27 | 19 | 18 | 18 | 17 |
|  | for grout after addition of 200 g/l of CLK 45 cement | | | | |
| Marsh Viscosity in seconds | 35 | 35 | 34 | 33 | 33 |
| API filtrate in cm3 after 30 min | 155 | 82 | 78 | 72 | 70 |
| Cake thickness in mm | 7.5 | 4 | 3 | 2.8 | 2.5 |
| Sweating in % | 2.5 | 1.5 | 1.0 | 0.8 | 0.5 |
| Rigidification time in hours | 4-5 | 7-8 | 9-10 | 15 | 25 |

As in example 1, there is a considerable reduction of filtrate and sweating and an increase in rigidification time. All of these improved characteristics attest to the very beneficial effects of the additive in the invention.

EXAMPLE 3

This example illustrates, comparatively, the behavior of the additive in the invention when it is chosen from acrylic polymers as well as from acrylic copolymers.

For this example, the applicants performed three reference tests: 11 (reference test without additive, 12 (a sodium polyacrylate additive) and 13 (an acrylic copolymer additive in the form of sodium salt).

The swelling clay used for these tests as well as the preparation conditions, implementation and checks of grouts were the same as in example 1.

The additive in the invention introduced at the rate of 3% by weight of commercial product to 40% dry extract with respect to the swelling clay, was:
  test 12: the same polymer as in example 1,
  test 13: an acrylic, methacrylic and methallyl sulfonate acid copolymer in the form of sodium salt with an average molecular weight equal to 3000, obtained according to processes known to the technician, by radical copolymerization in a hydroalcoholic medium constituted by a mixture of water and isopropanol.

All the results obtained for the various bentonite gels before and after the addition of 200 g/l of CLK 45 cement are given in Table 3 below.

TABLE 3

|  | Test 11 | Test 12 acrylic polymer 40% dry ext. | Test 13 acrylic copolymer 40% dry ext. |
|---|---|---|---|
| Additives as in invention | 0% | 3% | 3% |
|  | for Bentonite gel only | | |
| Marsh viscosity in seconds | 33.5 | 29 | 30 |
| API filtrate in cm3 | 14 | 12 | 13 |
|  | For grout after addition of 200 g/l of CLK 45 cement | | |
| Marsh viscosity in seconds | 43 | 39 | 39 |
| API filtrate in cm3 after 30 min | 195 | 65 | 80 |
| Cake thickness in mm | 10 | 2.5 | 4.5 |
| Sweating in % | 1.5 | 0 | 0 |
| Rigidification time in hours | 4-5 | 10-12 | 8-10 |

As can be seen, the introduction of an acrylic copolymer as an additive in the invention produces almost the same results as those already observed when the additive is an acrylic polymer, i.e., greatly reduced filtrate, almost no sweating and reduced Marsh viscosity.

EXAMPLE 4

In this example, the applicants have shown, in tests 14-21, that the qualities provided to the cement-swelling clay grouts with the additive in the invention (test 15), these qualities being low and stable viscosities, filtrate reduction and reduced cake thickness, are much better than those qualities given to the same grouts into which additives from prior art were introduced, additives such as: calcium lignosulfite (tests 16 and 17), ferrochrome lignosulfonate (tests 18-19) and sulfonic polynaphtylmethane (tests 20 and 21).

In all these tests, the swelling clay was the same as in example 1.

The grout preparation conditions and the checks were also the same as in example 1.

Also, the additive in the invention introduced in test no. 15 was the same as in example 1.

All the results obtained for the Bentonite gel and for the grouts after the addition of 200 g/l of CLK 45 cement are given in table 4 below.

TABLE 4

| | Reference test 14 | Test 15 | Test 16 | Test 17 | Test 18 | Test 19 | Test 20 | Test 21 |
|---|---|---|---|---|---|---|---|---|
| Additive type | no additive | Sodium polyacrylate - 40% dry ext. | Calcium lignosulfite - 25% dry ext. | | Ferrochrome lignosulfonate powder - 95% dry ext. | | Sulfonic polynaphtyl methane - 40% dry ext. | |
| Concentration in % of commercial product | 0 | 3 | 10 | 20 | 3.5 | 7 | 10 | 20 |
| *for bentonite gel only* | | | | | | | | |
| Marsh viscosity in sec. | 33.5 | 29 | 31.5 | 31 | 31 | 31 | 31.5 | 31.5 |
| *for grout after addition of 200 g/l of CLK 45 cement* | | | | | | | | |
| Marsh viscosity in sec. | 43 | 37 | 43 | 52 | 42 | 40 | 44 | 38 |
| API filtrate in cm3 after 30 minutes | 195 | 65 | 130 | 95 | 130 | 110 | 105 | 78 |
| Cake thickness in mm | 10 | 2.5 | 7.5 | 4.5 | 7.5 | 5 | 6 | 3.5 |
| Sweating in % | 1.5 | 0 | 0 | 0 | 0 | 0 | 0 | 0 |
| Rigid. time in hours | 4–5 | 10–12 | 16 | 30 | 15 | 8 | 6 | 8 |

All of these results demonstrate the remarkable performance of grouts into which the applicants have introduced the additive in the invention, especially concerning filtrate reduction.

We claim:

1. An additive for swelling clay grouts and cement-swelling clay grouts that reduces the filtrate, lowers and stabilizes the viscosity, retards rigidification time, limits sweating and the sedimentation of the solid constituents, comprising an alkaline ethylenic acid polymer and/or copolymer with a molecular weight between 3000 and 20,000.

2. An additive as in claim 1 wherein the molecular weight of the alkaline ethylenic acid polymer and/or copolymer is between 3000 and 6000.

3. An additive as in claim 1 or 2 formed by the polymerization and/or copolymerization of acrylic methacrylic, itaconic, maleic, methallyl sulfonic acids, and their esters.

4. An additive as in claim 3 wherein the alkaline polymer and/or copolymer is a sodium, potassium, ammonium, or lithium salt and is neutralized by primary, secondary or tertiary amines.

5. An additive as in claim 4 wherein the polymer and/or copolymer is formed by radical polymerization and/or copolymerization in a hydroalcoholic medium.

6. An additive as in claim 5 wherein polymerization and/or copolymerization is carried out in the presence of an alcohol selected from the group consisting of methanol, ethanol, propanol, isopropanol and butanol.

7. An additive as in claim 6 introduced into swelling clay grouts or cement swelling clay grouts comprising a swelling clay mass at 0.01–10% by weight of dry material relative to the swelling clay mass.

8. An additive as in claim 7 added to the swelling clay mass at any stage of its manufacture, prior to the formation of the grout.

9. An additive as in claim 8 added to the preparation water of swelling clay gels or cement-swelling clay grouts.

10. An additive as in claim 4 added to the swelling clay gel or cement-swelling clay grout previously prepared.

11. Swelling clay grouts or cement-swelling clay grouts as in claim 1 comprising 5–600 kg/m3 of swelling clays and 40–2000 kg/m3 of cements.

12. An additive as in claim 6 introduced into swelling clay grouts or cement-swelling clay grouts at 0.5 to 2% by weight of dry material relative to the swelling clay mass.

13. Swelling clay grouts as in claim 1 including a 25–400 kg/m3 of swelling clays.

14. Cement-swelling clay grouts as in claim 1 including 80–400 kg/m3 cements.

* * * * *